US008956069B2

(12) United States Patent
Kraft

(10) Patent No.: US 8,956,069 B2
(45) Date of Patent: Feb. 17, 2015

(54) TOOL-FREE CONNECTOR AND MOUNTING ARRANGEMENT

(75) Inventor: Regine Kraft, Johns Island, SC (US)

(73) Assignee: Robert Bosch GmbH, Stuttgart (DE)

( * ) Notice: Subject to any disclaimer, the term of this patent is extended or adjusted under 35 U.S.C. 154(b) by 197 days.

(21) Appl. No.: 13/480,942

(22) Filed: May 25, 2012

(65) Prior Publication Data
US 2013/0316571 A1 Nov. 28, 2013

(51) Int. Cl.
F16B 21/12 (2006.01)

(52) U.S. Cl.
USPC ........... 403/168; 403/316; 403/319; 403/324; 24/297

(58) Field of Classification Search
USPC ......... 403/168, 251, 264, 315, 316, 319, 324, 403/360, 249; 411/337, 510, 48; 24/581.11, 24/297, 458; 248/672, 673, 674, 678, 681; 439/569
See application file for complete search history.

(56) References Cited

U.S. PATENT DOCUMENTS

| 2,660,084 | A | 11/1953 | Newman |
| 4,122,583 | A | 10/1978 | Grittner et al. |
| 4,579,473 | A | 4/1986 | Brugger |
| 6,394,695 | B1 * | 5/2002 | Chausset ................. 403/397 |
| 6,457,217 | B2 * | 10/2002 | Yoshii et al. ............. 24/297 |
| 6,659,701 | B1 | 12/2003 | Risdale |
| 6,874,983 | B2 * | 4/2005 | Moerke et al. ............ 411/46 |
| 7,178,206 | B2 | 2/2007 | Kuhnle et al. |
| 7,510,163 | B2 * | 3/2009 | Schlitzkus et al. ........ 248/635 |
| 7,549,199 | B2 * | 6/2009 | Bugner ................... 24/297 |
| 8,043,038 | B2 | 10/2011 | Sano |
| 8,046,879 | B2 | 11/2011 | Werner et al. |
| 8,123,308 | B2 * | 2/2012 | Schlitzkus et al. ........ 303/119.2 |
| 8,316,514 | B2 * | 11/2012 | Sano ....................... 24/297 |
| 2006/0005363 | A1 | 1/2006 | Reiter |
| 2007/0057422 | A1 * | 3/2007 | Weh et al. ................ 267/141 |
| 2008/0157447 | A1 * | 7/2008 | Sobajima et al. ......... 267/141.1 |
| 2008/0193258 | A1 | 8/2008 | Legat et al. |
| 2008/0217824 | A1 * | 9/2008 | Schlitzkus et al. ........ 267/141.1 |
| 2008/0240852 | A1 * | 10/2008 | Weh et al. ................ 403/388 |
| 2009/0178247 | A1 | 7/2009 | Jalbert |
| 2012/0223211 | A1 * | 9/2012 | Mayr et al. ............... 248/634 |

OTHER PUBLICATIONS

Figs. 5 and 6—Admitted Prior Art, on sale or known publicly at least prior to May 25, 2011.

* cited by examiner

Primary Examiner — Daniel P Stodola
Assistant Examiner — Matthew R McMahon
(74) Attorney, Agent, or Firm — Michael Best & Friedrich LLP

(57) ABSTRACT

A connector includes a first portion having a shank defining an axis and a pair of flanges defining a receiving space therebetween, the pair of flanges extending from the shank substantially perpendicular to the axis. A second portion of the connector is movable relative to the first portion along the axis between a first position and a second position corresponding to a first configuration and a second configuration of the connector. The second portion includes at least one lobe that does not extend into the receiving space between the pair of flanges of the first portion when the connector is in the first configuration. The at least one lobe extends into the receiving space between the pair of flanges of the first portion when the connector is in the second configuration. The connector can be part of a mounting arrangement for mounting a component to a bracket.

12 Claims, 4 Drawing Sheets

TOOL-FREE CONNECTOR AND MOUNTING ARRANGEMENT

BACKGROUND

Vehicle hydraulic units are typically coupled to one or more fixtures or brackets with conventional fastener elements, such as bolts and nuts that must be manipulated with tools to apply a tightening torque at assembly. Although conventional fasteners are widely available and inexpensive, many applications, including the mounting of some vehicle hydraulic units, do not require particularly high strength, high torque assembly joints. In such applications, the use of conventional metal threaded fasteners, while convenient, can be detrimental to weight and assembly time, and can be subject to corrosion.

SUMMARY

In one aspect, the invention provides a mounting arrangement including a component, a bracket, and a connector. The component has a mounting portion. The bracket is configured to support the mounting portion of the component. The bracket has a slot with an open end, and the slot has a first width adjacent the open end and an area having a second width greater than the first width. The connector includes a first portion and a second portion movable relative to the first portion between a first position and a second position corresponding to a first configuration and a second configuration of the connector. The first portion of the connector includes a shank engaged with the mounting portion of the component, and a pair of flanges defining a receiving space therebetween. The bracket is positioned in the receiving space when the first portion of the connector is received in the slot to fix a position of the connector relative to the bracket in a first direction. The second portion of the connector includes at least one lobe configured to extend into the receiving space between the pair of flanges of the first portion and occupy the slot area of the second width when the connector is in the second configuration to fix a position of the connector relative to the bracket in a second direction, substantially perpendicular to the first direction.

In another aspect, the invention provides a connector including a first portion having a shank defining an axis and a pair of flanges defining a receiving space therebetween, the pair of flanges extending from the shank substantially perpendicular to the axis. A second portion of the connector is movable relative to the first portion along the axis between a first position and a second position corresponding to a first configuration and a second configuration of the connector. The second portion includes at least one lobe that does not extend into the receiving space between the pair of flanges of the first portion when the connector is in the first configuration. The at least one lobe extends into the receiving space between the pair of flanges of the first portion when the connector is in the second configuration.

In yet another aspect, the invention provides a method of securing a component to a bracket. A component, a bracket, and a connector are provided, and the connector is in a first configuration. A first portion of the connector is secured to the component. The connector is slid into an open-ended slot of the bracket such that a pair of flanges of the connector flank opposing sides of the bracket, thereby fixing a position of the component and the connector in a first direction. A second portion of the connector is slid with respect to the first portion along the first direction, without rotation, to engage a resilient locking feature that secures the first and second portions together in a second configuration, thereby utilizing the second portion to secure the component and the connector against removal from the slot in a direction substantially perpendicular to the first direction while the connector is in the second configuration.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
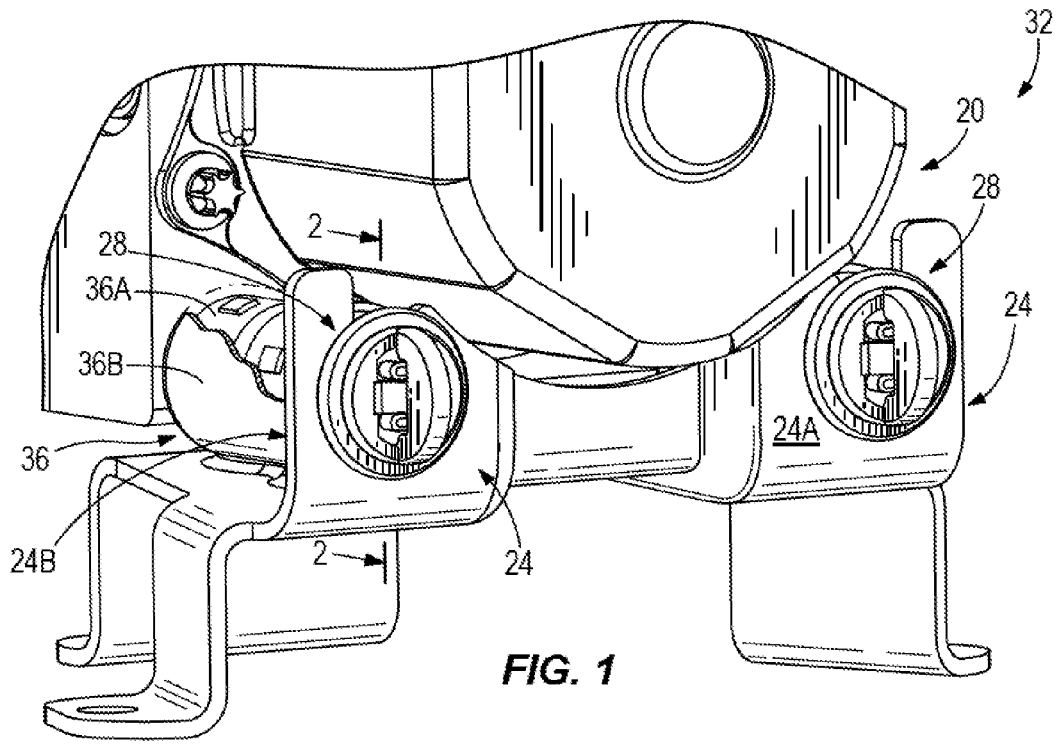
FIG. 1 is a perspective view of a mounting arrangement including a vehicle hydraulic unit coupled to a pair of brackets with a pair of connectors.

FIG. 1 illustrates a component 20 (e.g., a hydraulic unit for a vehicle braking system) that is supported by a pair of brackets 24. Although two substantially identical brackets 24 are illustrated, it should be appreciated that one or more than two brackets 24 may be provided, and that the brackets 24 need not be particularly similar in construction. As described in further detail below, the component 20 is coupled to the brackets 24 via corresponding fasteners or connectors 28 so that the component 20 may be supported substantially immovably by the brackets 24. Although transmission of vibrations may be limited between the component 20 and the brackets 24, removal of the component 20 from the brackets 24 is substantially prevented by the connectors 28. The component 20, together with one or more brackets 24, and one or more connectors 28 define a mounting arrangement 32.

As shown in FIG. 1, the component 20 includes multiple mounting portions 36 for mounting the component 20 to the brackets 24. In the illustrated construction, each mounting portion 36 is a vibration isolation mounting portion configured to damp vibrations generated by operation of the component 20, which may include one or more pumps and valves to control flow of pressurized hydraulic fluid. Each mounting portion 36 includes a resilient damping member 36A positioned within a rigid cup member 36B. It should be understood that other types of mounting portions 36, including simpler constructions which need not be vibration isolating, can be provided to couple the component 20 to the brackets 24.

Figure 2:
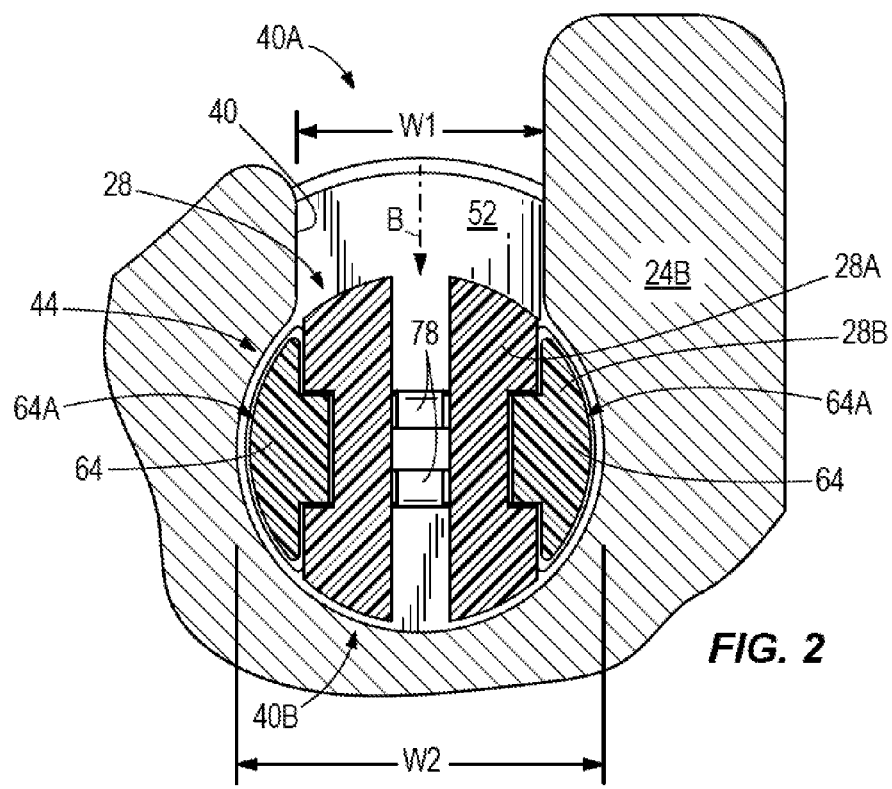
FIG. 2 is a cross-sectional view of one of the connectors received in one of the brackets, taken along line 2-2 of FIG. 1.

Referring to FIG. 2, each bracket 24 includes a slot 40, and each slot 40 has an open end 40A. A cross-section through one of the slots 40 is provided in FIG. 2, with the understanding that the other illustrated bracket 24 is of similar construction. The slot 40 has a first width W1 adjacent the open end 40A. As illustrated, the first width W1 is substantially constant across the slot 40, in a direction along the slot 40 away from the open end 40A, to an area 44 remote from the open end 40A where the width is expanded in at least one direction beyond the first width W1. In the illustrated construction, the area 44 is a substantially circular cutout having a second width W2 substantially larger than the first width W1. The enlarged-width area 44 can be located adjacent a closed end 40B of the slot 40 as shown, but need not be in alternate constructions.

One of the connectors 28 is illustrated in detail in FIGS. 3A-4B, with the understanding that additional connectors 28 can have a similar construction to that shown and described below. As shown in the figures, only one connector 28 is used for coupling each mounting portion 36 with the corresponding bracket 24. Each connector 28 includes a first portion 28A and a second portion 28B. The connector portions 28A, 28B can be separately-formed pieces assembled together, or alternately a unitary or integral piece with separately movable portions. Although not necessarily required, the connector portions 28A, 28B can be formed of plastic. The first connector portion 28A includes a shank 48 defining an axis A, or first direction. The shank 48 can be substantially cylindrical and is configured for fastening with one of the mounting portions 36 in secured relationship therewith. For example, the shank 48 can be a pin, rivet, threaded fastener, etc. The first connector portion 28A further includes a pair of spaced-apart flanges 52. The flanges 52 may be parallel to each other and may be substantially perpendicular to the axis A defined by the shank 48. For example, both flanges 52 may extend radially from the shank 48, which is generally elongated about the axis A. The illustrated flanges 52 are circular and extend around a full 360-degree periphery of the shank 48, but other constructions are optional. A receiving space 56, which is substantially annular, is defined between the flanges 52.

The second connector portion 28B has a shape complementary to the first connector portion 28A so that the two connector portions 28A, 28B are slidable relative to each other along the axis A (with substantially no rotation about the axis A). The second connector portion 28B includes a head portion 60 from which at least one lobe 64 extends generally parallel to the axis A or first direction. As illustrated, two lobes 64 are provided, but one or more than two lobes 64 can be provided in other constructions. Each of the lobes 64 has an exterior (e.g., radially outward) surface 64A that is semi-cylindrical. That is, the exterior surfaces 64A have the shape of a cylinder, but do not extend a full 360 degrees about the axis A. In other constructions, the lobe(s) 64 can have exterior surfaces that are not semi-cylindrical. Furthermore, multiple lobes 64 need not have similarly shaped exterior surfaces. Returning to the illustrated construction, the two lobes 64 are diametrically opposed from each other about the axis A. The exterior surfaces 64A have a common arcuate curvature centered about the axis A as viewed along the axis A. The distance between the exterior surfaces 64A of the two lobes 64 is substantially equal to the second width W2, measured at the slot area 44 as shown in FIG. 2. The shape of the exterior surfaces 64A is also substantially similar to the shape of the slot area 44. Although these corresponding shapes are generally circular as viewed along the axis A in the illustrated construction, other corresponding shapes, regular or irregular, can be provided. The first portion 28A of the connector 28 includes apertures 68 configured to receive the respective lobes 64. The first portion 28A also includes flange connection segments 72 extending between the flanges 52. The apertures 68 and the connection segments 72 provide a complementary shape for receiving the second connector portion 28B, particularly the lobes 64, in sliding relationship along the axis A.

Figure 3A:
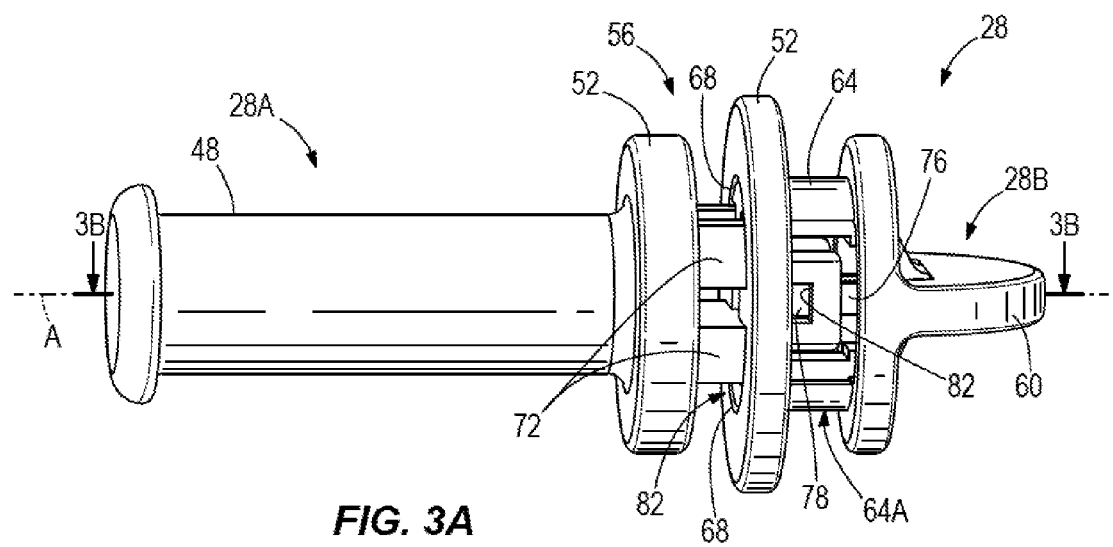
FIG. 3A is a perspective view of one of the connectors of FIGS. 1-2, in a first configuration.
Figure 3B:
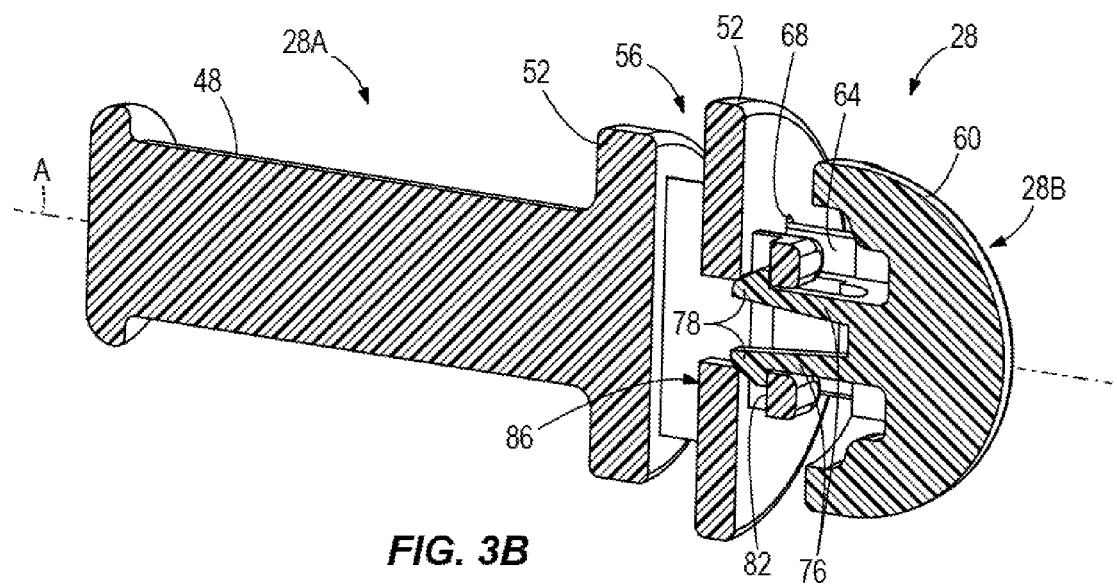
FIG. 3B is a cross-sectional view of the connector, taken along line 3B-3B of FIG. 3A.
Figure 4A:
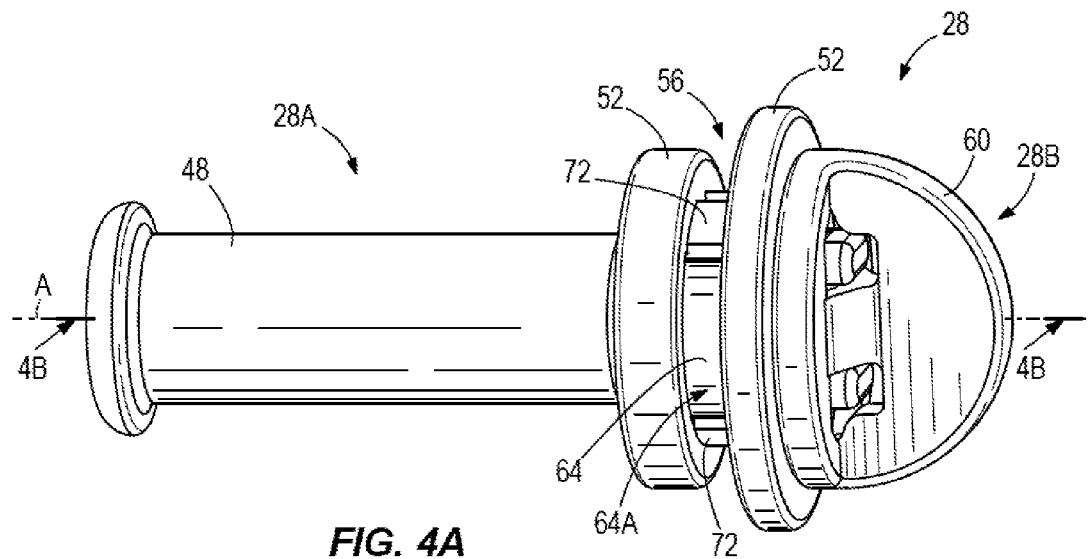
FIG. 4A is a perspective view of one of the connectors of FIGS. 1-2, in a second configuration.
Figure 4B:
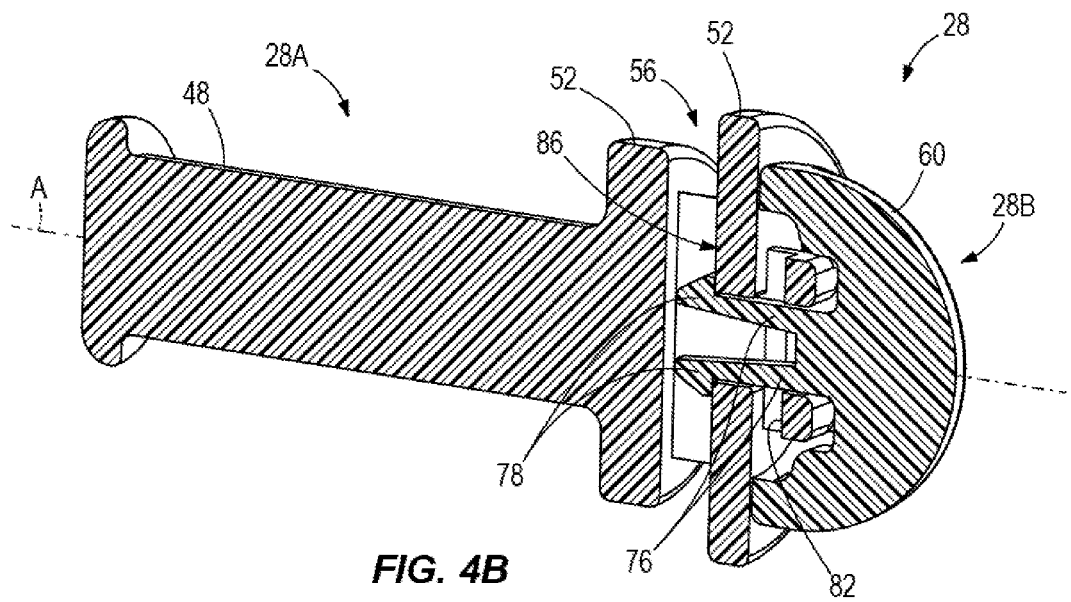
FIG. 4B is a cross-sectional view of the connector, taken along line 4B-4B of FIG. 4A.

Although the first and second connector portions 28A, 28B are movable relative to each other along the axis A, a resilient locking feature is provided between the connector portions 28A, 28B to inhibit relative movement in certain configurations or relative positions. In the illustrated construction, the resilient locking feature includes two resilient detent fingers 76 formed on the second connector portion 28B. It should be understood, that one or more than two resilient detent fingers can be provided, and that the resilient detent fingers can be provided on the first connector portion 28A instead. Each of the resilient detent fingers 76 includes a barb 78 at a distal end. In a first configuration of the connector 28 (FIGS. 3A and 3B), the resilient detent fingers 76 are engaged with a first feature of the first connector portion 28A. The first feature can be a pair of ledges or walls 82 provided on the first connector portion 28A spaced from the one of the flanges 52 that is remote from the shank 48. In the first configuration, as shown in FIGS. 3A and 3B, the connector 28 is in a pre-assembly state or assembly-ready state. In this configuration, the connector portions 28A, 28B are coupled together and inhibit separation, but are not fully assembled and can be pressed further into engagement. In the second or fully assembled configuration (FIGS. 4A and 4B), the resilient detent fingers 76 are engaged with a second feature of the first connector portion 28A. In the illustrated configuration, the second feature is the flange 52, more particularly the interior side 86 of the flange 52 that is remote from the shank 48. As described in more detail below, the lobes 64 are not positioned within the receiving space 56 between the flanges 52 when the connector 28 is in the first configuration, and the lobes 64 are positioned within the receiving space 56 when the connector 28 is in the second configuration.

Operation of the connector 28 to secure one of the mounting portions 36 of the component 20 to one of the brackets 24 is as follows. The connector 28 is secured to the component 20. More particularly, the shank 48 of the first connector portion 28A is secured to the mounting portion 36. The connection depends upon the configuration of the shank 48 and the mounting portion 36, but can be a simple press-together connection, wherein the shank 48 is formed as a smooth pin insertable into a resilient isolation member. The shank 48 can have a slight increase in size (e.g., diameter) toward the flanges 52 so that the press fit connection can be tight fitting and secure. In other constructions, other types of connections may be used to secure the first connector portion 28A with the component mounting portion 36, such as threaded connections. With the first connector portion 28A secured to the component mounting portion 36, the first connector portion 28A, either with or without the second connector portion 28B, is slid into the slot 40 of the bracket 24 (in a second direction B from the open end 40A, see FIG. 2) such that the pair of flanges 52 flank opposing sides 24A, 24B or faces of the bracket 24. The first connector portion 28A is slid into the slot 40 until positioned at the area 44 of the second width W2. The second connector portion 28B can be coupled to the first connector portion 28A before or after sliding the first connector portion 28A into the slot 40. As the connector 28 is slid into the slot 40, the bracket 24 is received between the flanges 52 to fix a mutual position of the component 20 and the connector 28 with respect to the bracket 24 in a first direction, which is the axial direction A. The second connector portion 28B is then slid with respect to the first portion 28A along the direction of axis A, without rotation, to engage the resilient locking feature (e.g., resilient detent fingers 76) that secures the first and second portions 28A, 28B together in the second configuration. In other words, the connector portions 28A, 28B are brought into further engagement with each other by simply pressing the second connector portion 28B further into the first connector portion 28A. When the connector 28 is put into the second configuration, the component 20 and the connector 28 are secured against removal from the slot 40 in a direction parallel to second direction B (FIG. 2) (substantially perpendicular to the direction of axis A) by engagement or interference between the lobes 64 of the second connector portion 28B and the bracket 24 while the connector 28 is in the second configuration. In particular, the presence of the lobes 64 in the receiving space 56 puts the lobes 64 within the area 44 of the bracket slot 40, with which they are generally form-fitting. Regardless of whether or not the lobes 64 are form-fitting with the slot area 44, the distance across the lobes 64 (about equal to width W2) is substantially greater than the first width W1 such that removal of the connector 28 through the open slot end 40A is prevented. Thus, the connector 28 along with the component 20 to which it is secured are substantially fixed with respect to the bracket 24.

Figure 5:
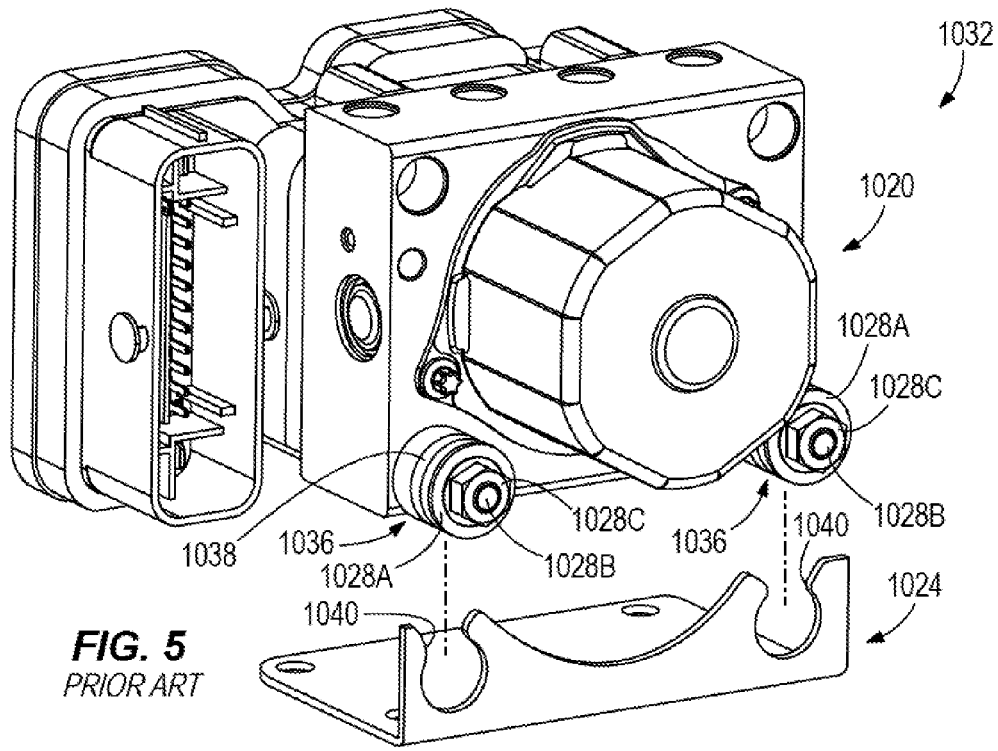
FIG. 5 is an exploded assembly view of a prior art mounting arrangement for a vehicle hydraulic unit.
Figure 6:
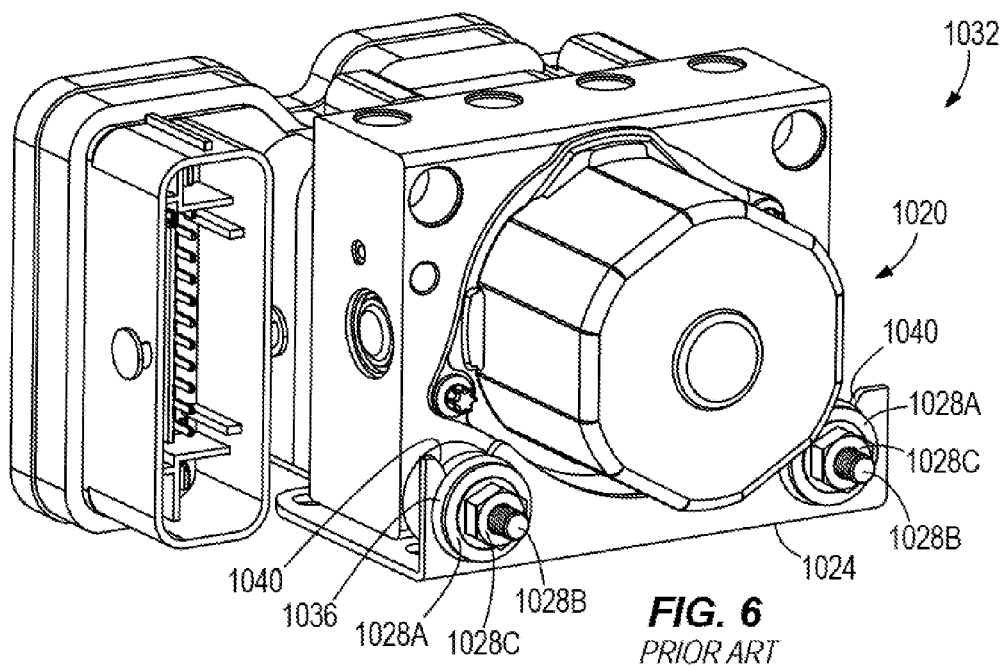
FIG. 6 is an assembled view of the prior art mounting arrangement of FIG. 5.

A conventional mounting arrangement 1032 for a vehicle hydraulic unit 1020 is shown in FIGS. 5 and 6. Unlike the mounting arrangement 32 described above, a vibration isolation member 1036 is provided with an annular recess 1038 which is directly inserted into a slot 1040 in a bracket 1024. A threaded fastener assembly including a washer 1028A, a threaded fastener 1028B, and a nut 1028C (all constructed of metal) are provided to secure the isolation member 1036 in the bracket slot 1040 through compression. The threaded fastener assembly requires a torque operation carried out with at least one tool. Furthermore, the metal fastening components are heavier and less corrosion resistant than plastic used in construction of the connector 28.

Various features and advantages of the invention are set forth in the following claims.

What is claimed is:

1. A mounting arrangement comprising:
a component having a mounting portion;
a bracket configured to support the mounting portion of the component, the bracket having a slot with an open end, wherein the slot has a first width adjacent the open end and an area having a second width greater than the first width; and
a connector including a first portion and a second portion movable relative to the first portion between a first position and a second position corresponding to a first configuration and a second configuration of the connector,
wherein the first portion of the connector includes an axially extending shank engaged with the mounting portion of the component, and a pair of flanges defining a receiving space axially therebetween, the bracket being positioned in the receiving space when the first portion of the connector is received in the slot to fix a position of the connector relative to the bracket in a first axial direction, the first portion further including at least one flange connection segment,
wherein the second portion of the connector includes at least one lobe configured to extend into the receiving space between the pair of flanges of the first portion and occupy the slot area of the second width when the connector is in the second configuration to fix a position of the connector relative to the bracket in a second direction, substantially perpendicular to the first axial direction, and
wherein an exterior surface of the at least one lobe of the second portion of the connector and an exterior surface of the at least one flange connection segment of the first portion of the connector collectively define a radially outward-facing annular surface between the pair of flanges when the connector is in the second configuration, such that an outer width of said radially outward-facing annular surface is substantially equal to the second width of the slot, so as to block removal of the connector from the slot when the connector is in the second configuration.

2. The mounting arrangement of claim 1, wherein the second portion is slidable along the first direction between the first position and the second position.

3. The mounting arrangement of claim 2, wherein the connector includes a resilient locking feature that inhibits removal of the second portion from the second position.

4. The mounting arrangement of claim 3, wherein the first and second portions are separate from each other and wherein the resilient locking feature is configured to inhibit separation of the first and second portions from the first configuration.

5. The mounting arrangement of claim 3, wherein the resilient locking feature includes at least one resilient detent finger on the second portion configured to engage one of the pair of flanges of the first portion in the second configuration.

6. The mounting arrangement of claim 3, wherein the at least one lobe includes two diametrically-opposed lobes, and wherein the resilient locking feature is positioned substantially between the two lobes.

7. The mounting arrangement of claim 1, wherein the at least one lobe includes two diametrically-opposed lobes.

8. The mounting arrangement of claim 7, wherein each of the two lobes includes a semi-cylindrical outside surface which make up a portion of the radially outward-facing annular surface.

9. The mounting arrangement of claim 8, wherein a distance between the semi-cylindrical outside surfaces of the two lobes is substantially equal to the second width of the slot.

10. The mounting arrangement of claim 1, wherein the first and second portions of the connector are non-rotatable relative to each other.

11. The mounting arrangement of claim 1, wherein the at least one lobe extends into the receiving space through a corresponding aperture of the first portion.

12. The mounting arrangement of claim 11, wherein the shape of the at least one lobe is complementary with the corresponding aperture such that rotation between the first and second connector portions is inhibited.

* * * * *